United States Patent
Li et al.

(10) Patent No.: US 11,879,874 B2
(45) Date of Patent: Jan. 23, 2024

(54) TBM-MOUNTED SURROUNDING ROCK WEAR RESISTANCE TESTING SYSTEM AND METHOD

(71) Applicant: SHANDONG UNIVERSITY, Shandong (CN)

(72) Inventors: Shucai Li, Jinan (CN); Zhenhao Xu, Jinan (CN); Heng Shi, Jinan (CN); Peng Lin, Jinan (CN); Tengfei Yu, Jinan (CN); Huihui Xie, Jinan (CN); Yichi Zhang, Jinan (CN); Ruiqi Shao, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 39 days.

(21) Appl. No.: 17/641,007

(22) PCT Filed: Sep. 7, 2020

(86) PCT No.: PCT/CN2020/113816
§ 371 (c)(1),
(2) Date: Mar. 7, 2022

(87) PCT Pub. No.: WO2021/043307
PCT Pub. Date: Mar. 11, 2021

(65) Prior Publication Data
US 2022/0291105 A1 Sep. 15, 2022

(30) Foreign Application Priority Data

Sep. 6, 2019 (CN) .......................... 201910843385.0
Jan. 21, 2020 (CN) .......................... 202010070813.3

(51) Int. Cl.
*G01N 3/56* (2006.01)

(52) U.S. Cl.
CPC ....... *G01N 3/56* (2013.01); *G01N 2203/0048* (2013.01)

(58) Field of Classification Search
CPC ....................................................... G01N 3/56
(Continued)

(56) References Cited

U.S. PATENT DOCUMENTS

2011/0031017 A1    2/2011   Iwata et al.

FOREIGN PATENT DOCUMENTS

| CN | 101634225 A |   | 1/2010 |
| CN | 108287110 A | * | 7/2018 |

(Continued)

OTHER PUBLICATIONS

Liu et al. Machine Translation of "Research on wear resistance of rock based on TBM construction." Technology Innovation and Application, 2016. p. 249. (Year: 2016).*

(Continued)

*Primary Examiner* — Walter L Lindsay, Jr.
*Assistant Examiner* — Philip T Fadul
(74) *Attorney, Agent, or Firm* — Oliff PLC

(57) ABSTRACT

A TBM-mounted surrounding rock wear resistance testing system and method, the system including: a fixing module, arranged on a TBM, the module has a movable end for extending to the surrounding rock of a tunnel; a surrounding rock polishing module on the movable end, the module includes a polishing mechanism for test area; a surrounding rock wear resistance testing module on the movable end, follows the movable end moving the test area, and including a mechanism for testing the wear resistance of the polished test area and a drive mechanism thereof; and a central control module, configured to control the motion states and operations of the fixing module, the surrounding rock polishing module and surrounding rock wear resistance testing (Continued)

module, and determine the wear resistance of the surrounding rock according to the wear resistance test result. The system can polish tunnel surrounding rock during TBM excavation and test wear resistance.

16 Claims, 3 Drawing Sheets

(58) Field of Classification Search
USPC .................................................................. 73/7
See application file for complete search history.

(56) References Cited

FOREIGN PATENT DOCUMENTS

| CN | 109443917 A | 3/2019 |
|----|-------------|--------|
| CN | 109612943 A | 4/2019 |
| CN | 209190416 U | 8/2019 |
| CN | 111220493 A | 6/2020 |

OTHER PUBLICATIONS

Xue et al. Machine Translation of CN 109612943 A. Published Apr. 2019. (Year: 2019).*
Li et al. Machine Translation of CN 101634225 A. Published Jan. 2010. (Year: 2010).*
Wang et al. Machine Translation of CN 209190416 U. Published Aug. 2019. (Year: 2019).*
Huang et al. Machine Translation of CN 108287110 A. Published Jul. 2018. (Year: 2018).*
Liu et al.; "Research on Abrasion Resistance of Rocks Processed by TBM;" Technology Innovation and Application; 2016; pp. 249; No. 6.
Nov. 30, 2020 Search Report issued in International Patent Application No. PCT/CN2020/113816.
Nov. 30, 2020 Written Opinion of the International Searching Authority issued in International Patent Application No. PCT/CN2020/113816.

* cited by examiner

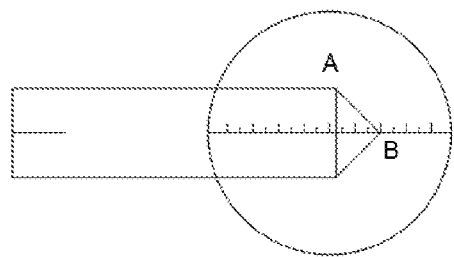
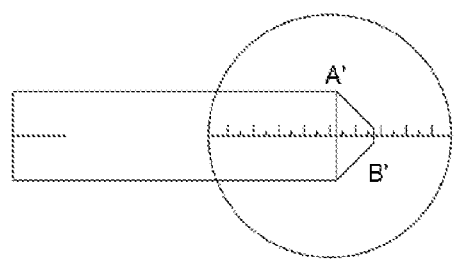
FIG. 6(a)　　　　　　　　　　FIG. 6(b)
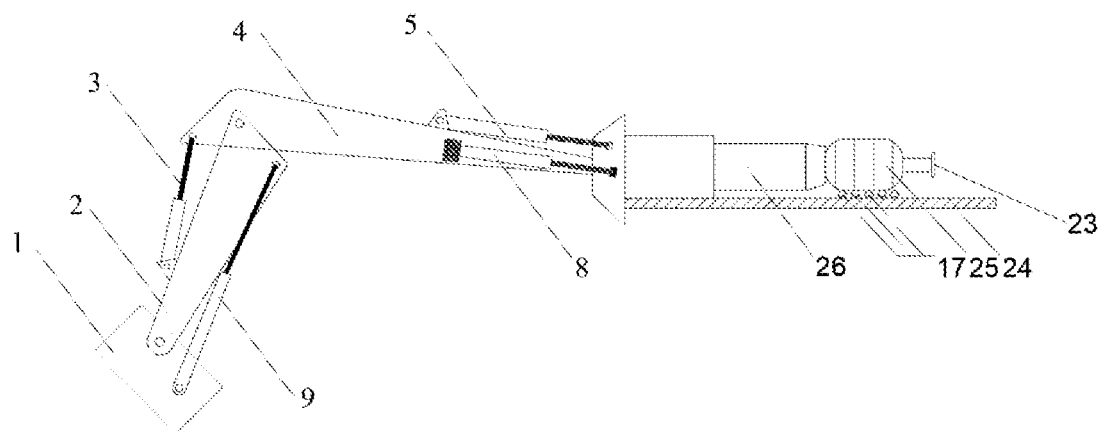
FIG. 7
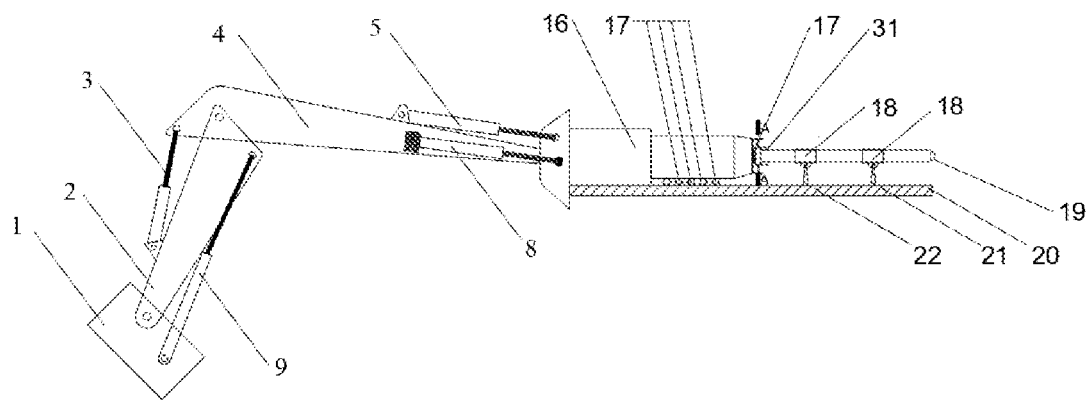
FIG. 8

TBM-MOUNTED SURROUNDING ROCK WEAR RESISTANCE TESTING SYSTEM AND METHOD

FIELD OF THE INVENTION

The present disclosure belongs to the field of wear resistance testing of the surrounding rock in TBM excavation tunnels, and specifically relates to a TBM (tunnel boring machine)-mounted surrounding rock wear resistance testing system and method.

BACKGROUND OF THE INVENTION

The statement of this section merely provides background art information related to the present disclosure, and does not necessarily constitute the prior art.

Tunnel boring machines (TBMs) are used for tunnel excavation, which have the advantages of fast construction speed, high safety, little disturbance to surrounding rock, low labor intensity, etc., and therefore, have been widely used in tunnel excavation construction. However, the use of TBMs also has some problems, such as excessive tool wear, and different tunneling speeds and difficulties in different states, which are closely related to the wear resistance of the rock. Rock friction is closely related to rock structure, mineral hardness, mineral particle size, porosity, stress state, etc. Wear resistance testing of the surrounding rock is conducive to the estimation of tool wear, estimation of a construction period, reasonable arrangements of human and material resources, engineering pricing, and engineering claims. Therefore, the wear resistance testing plays an important role in TBM construction.

As far as the inventor knew, the current method for testing the wear resistance of the rock is mainly indoor test, in which the surrounding rock is drilled for sampling, and then the surface of the sample is ground to obtain a standard sample, so the whole process takes a long time and costs a lot. In addition, the buried depths of tunnels vary from tens of meters to thousands of meters, the horizontal stress of the surrounding rock in the tunnels is large, and the local tectonic stress can reach several MPa. The horizontal stress has a great impact on the wear resistance of the rock, and the drilling for sampling will damage the surrounding rock and destroy the stress state of the rock, so that the indoor surrounding rock wear resistance testing cannot perfectly reproduce the stress state of the surrounding rock during TBM excavation, which then affects the test results. For some ultra-long tunnels, it takes a long time to enter and exit the tunnel once, so the indoor testing cannot meet the requirements of TBM tunnel engineering for rapid excavation, rapid testing and accurate testing.

SUMMARY OF THE INVENTION

In order to solve the above problems, the present disclosure proposes a TBM-mounted surrounding rock wear resistance testing system and method, which can polish tunnel surrounding rock and test wear resistance test during TBM construction, so as to meet the requirements of engineering for rapid excavation, rapid testing and accurate testing.

According to some embodiments, the present disclosure adopts the following technical solutions: In a first aspect, the present disclosure provides a TBM-mounted surrounding rock wear resistance testing system, including:

a fixing module, arranged on a TBM, the fixing module having a movable end for extending to the surrounding rock of a tunnel;

a surrounding rock polishing module, arranged on the movable end, the surrounding rock polishing module includes a polishing mechanism for polishing a surrounding rock test area;

a surrounding rock wear resistance testing module, arranged on the movable end, capable of following the movable end to move to the surrounding rock test area, and including a testing mechanism for testing the wear resistance of the polished surrounding rock test area and a drive mechanism thereof; and a central control module, configured to control the motion states and performed operations of the fixing module, the surrounding rock polishing module and the surrounding rock wear resistance testing module; and determine the wear resistance of the surrounding rock according to the wear resistance test result.

As an optional implementation manner, the surrounding rock polishing module and/or the surrounding rock wear resistance testing module are detachably connected to the movable end.

As an optional implementation manner, the surrounding rock polishing module and the surrounding rock wear resistance testing module are integrally arranged on the movable end by a connecting mechanism.

As an optional implementation manner, the fixing module includes a movable end transmission mechanism and a movable end drive mechanism, one end of the movable end transmission mechanism is fixedly connected to the TBM, the other end of the movable end transmission mechanism is connected to the movable end, and the operation of the movable end transmission mechanism and the position of the movable end are controlled by the driving of the movable end drive mechanism.

As an optional implementation manner, the movable end transmission mechanism includes a first mechanical arm and a second mechanical arm, one end of the first mechanical arm is hinged with the TBM, the other end of the first mechanical arm is hinged with one end of the second mechanical arm, and the other end of the second mechanical arm is connected with the movable end;

The movable end drive mechanism includes a first drive link, a second drive link, a third drive link and a fourth drive link;

Two ends of the first drive link are respectively hinged with the first mechanical arm and the second mechanical arm;

Two ends of the second drive link are respectively connected with the second mechanical arm and the movable end;

Two ends of the third drive link are respectively hinged with the second mechanical arm and the movable end;

Two ends of the fourth drive link are respectively hinged with the first mechanical arm and the TBM.

As an optional implementation manner, the movable end includes a connecting block, the connecting block is provided with a spherical cavity for accommodating a spherical structure, and the spherical structure is fixedly connected with the second mechanical arm;

The movable end is provided with a protective box for protecting the surrounding rock polishing module and the surrounding rock wear resistance testing module, a bottom plate of the protective box is fixedly connected with the connecting block, the protective box is provided with an opening on the side facing the surrounding rock, and the open side is provided with support legs in contact with the surrounding rock.

As an optional implementation manner, the surrounding rock polishing module includes a fourth hydraulic drive mechanism arranged at the movable end and capable of extending and retracting in the axial direction, a motor, and a polishing disc arranged outward;

A free end of the fourth hydraulic drive mechanism is fixedly connected to the motor, and a telescopic shaft of the motor is coaxially and fixedly connected with the polishing disc.

As an optional implementation manner, the surrounding rock polishing module further includes a second support beam arranged at the movable end in a vertically movable manner, the fourth hydraulic drive mechanism is arranged on the second support beam, and balls are arranged between the motor and the second support beam.

As an optional implementation manner, the surrounding rock wear resistance testing module includes a first hydraulic drive mechanism arranged at the movable end and capable of extending and retracting in the axial direction, a free end of the first hydraulic drive mechanism is detachably provided with a steel needle, and the steel needle is parallel to the axis of the first hydraulic drive mechanism.

As an optional implementation manner, the surrounding rock wear resistance testing module further includes a first support beam arranged at the movable end in a vertically movable manner, the first hydraulic drive mechanism is arranged on the first support beam, at least one second hydraulic drive mechanism capable of extending and retracting vertically is further arranged on the first support beam, a free end of the second hydraulic drive mechanism is provided with a fixing sleeve for fixing the steel needle, the steel needle is arranged at the free end of the first hydraulic drive mechanism in a manner of being movable along a plane, and the plane is perpendicular to the axial direction of the steel needle.

In a second aspect, the present application further provides a TBM-mounted surrounding rock wear resistance testing method, including the following steps:

determining a surrounding rock test area of a tunnel;
adjusting the position of the surrounding rock polishing module arranged on the TBM, so that the polishing mechanism of the surrounding rock polishing module is aligned with the surrounding rock test area for polishing;
adjusting the position of the surrounding rock wear resistance testing module arranged on the TBM, so that the testing mechanism of the surrounding rock wear resistance testing module is aligned with the polished surrounding rock test area to test the wear resistance; and
determining the wear resistance of the surrounding rock according to the test result of the wear resistance test.

As an optional implementation manner, the testing mechanism being aligned with the polished surrounding rock test area to test the wear resistance includes: driving the surrounding rock wear resistance testing module so that the testing mechanism presses against the rock under a set pressure, and moving the testing mechanism by a set distance at a set speed along the surrounding rock test area while maintaining the set pressure.

Compared with the prior art, the beneficial effects of the present disclosure are:

1. By directly arranging the surrounding rock polishing module and the surrounding rock wear resistance testing module on the TBM in the present disclosure, the complex sample acquisition, polishing, and preparation processes are transformed into a relatively easy in-situ test, which saves workload;
2. In the present disclosure, the test site is placed on the construction site, which saves time wasted in sample processing and transfer, enables the site construction personnel to quickly understand surrounding rock situations, and has a guidance effect on construction;
3. The present disclosure performs in-situ test, which does not cause secondary damage to the surrounding rock, and has minimum damage to the stress state of the surrounding rock, thus the measurement result is more accurate;
4. The present disclosure integrates rock polishing and rock wear resistance measurement, making the real-time measurement of wear resistance of the tunnel surrounding rock come true, and providing a technical support for rapid tunnel excavation construction;
5. In the present disclosure, the steel needle can be placed horizontally or obliquely during test, and can also be consistent with the excavation direction of the tunnel boring machine, so that the test result highly conforms to the actual engineering, and has a greater guidance effect on the actual engineering;
6. The surrounding rock polishing module or the surrounding rock wear resistance testing module of the present disclosure is connected with the movable end by plugging, threaded connection or other detachable connection methods, the surrounding rock polishing module can be installed first for polishing, and then the surrounding rock wear resistance testing module is installed for testing to reduce the size of the overall system and facilitate practical applications.

BRIEF DESCRIPTION OF THE DRAWINGS

The accompanying drawings constituting a part of the present disclosure are used for providing a further understanding of the present disclosure, and the schematic embodiments of the present disclosure and the descriptions thereof are used for interpreting the present disclosure, rather than constituting improper limitations to the present disclosure.

FIG. 6(*a*) and FIG. 6(*b*) are schematic diagrams of wear calculation;

FIG. 7 is a schematic structural diagram of a second embodiment;

FIG. 8 is a schematic structural diagram of the second embodiment.

Figure 1:
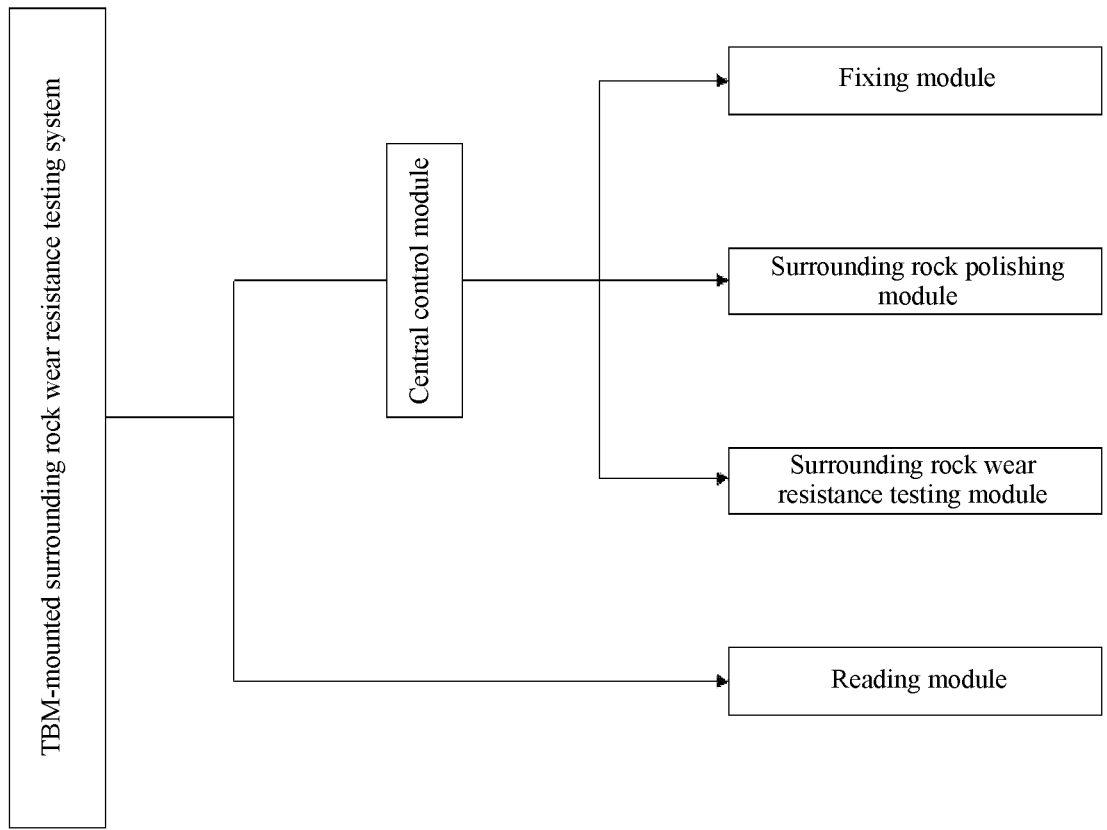
FIG. 1 is a logical block diagram of a first embodiment.

In which: 1. Base, 2. First mechanical arm, 3. First drive link, 4. Second mechanical arm, 5. Second drive link, 6. Test box, 7. Support leg, 8. Third drive link, 9. Fourth drive link, 10. Steel ball, 11. Connecting block, 12. First fixing tube, 13. Support column, 14. Upright column, 15. Second fixing tube, 16. First hydraulic drive mechanism, 17. Ball, 18. Fixing sleeve, 19. Steel needle, 20. First support beam, 21. Second hydraulic drive mechanism, 22. Third hydraulic drive mechanism, 23. Polishing disc, 24. Second support beam, 25. Motor, 26. Fourth hydraulic drive mechanism, 27. First connecting rod, 28. Second connecting rod, 29. Fifth hydraulic drive mechanism, 30. Third fixing tube, 31. Locating block, 32. Spring, 33. Support frame, 34. Eyepiece, 35. Objective lens, 36. Semicircular locating tube, 37. Support arm, 38. Support seat.

DETAILED DESCRIPTION OF THE EMBODIMENTS

The present disclosure will be further illustrated below in conjunction with the accompanying drawings and embodiments.

It should be noted that the following detailed descriptions are exemplary and are intended to provide further descriptions of the present disclosure. All technical and scientific terms used herein have the same meaning as commonly understood by those of ordinary skill in the technical filed to which the present disclosure belongs, unless otherwise indicated.

It should be noted that the terms used here are merely used for describing specific embodiments, but are not intended to limit the exemplary embodiments of the present disclosure. As used herein, unless otherwise clearly stated in the context, singular forms are also intended to include plural forms. In addition, it should also be understood that when the terms "comprise" and/or "include" are used in the description, it indicates the presence of features, steps, operations, devices, components, and/or combinations thereof.

In the present disclosure, the terms such as "upper", "lower", "left", "right", "front", "rear", "vertical", "horizontal", "side", and "bottom" indicate the orientation or positional relationships based on the orientation or positional relationships shown in the drawings, are only relationship terms determined for the convenience of describing the structural relationships of various components or elements of the present disclosure, but do not specify any component or element in the present disclosure, and cannot be understood as limitations to the present disclosure.

In the present disclosure, the terms such as "fixed", "connected" and "coupled" should be generally understood, for example, the "connected" may be fixedly connected, detachably connected, integrally connected, directly connected, or indirectly connected by a medium. For a related scientific research or technical person in this art, the specific meanings of the above terms in the present disclosure may be determined according to specific circumstances, and cannot be understood as limitations to the present disclosure.

Embodiment 1

As shown in FIG. 1, a TBM-mounted surrounding rock wear resistance testing system includes: a central control module, a fixing module, a surrounding rock polishing module, a surrounding rock wear resistance testing module and a reading module;

The central control module is connected with the fixing module, the surrounding rock polishing module and the surrounding rock wear resistance testing module, and controls the operations of the fixing module, the surrounding rock polishing module and the surrounding rock wear resistance testing module; the fixing module is configured to fix a test box 6 on a TBM and a surrounding rock, which facilitates testing; the surrounding rock polishing module is configured to finely polish a flat test plane in the surrounding rock to meet the requirements of wear resistance testing; the surrounding rock wear resistance testing module is configured to test the wear resistance on the polished test plane; and the reading module is configured to test a worn steel needle 19 and provide a final rock wear resistance test result.

Figure 2:
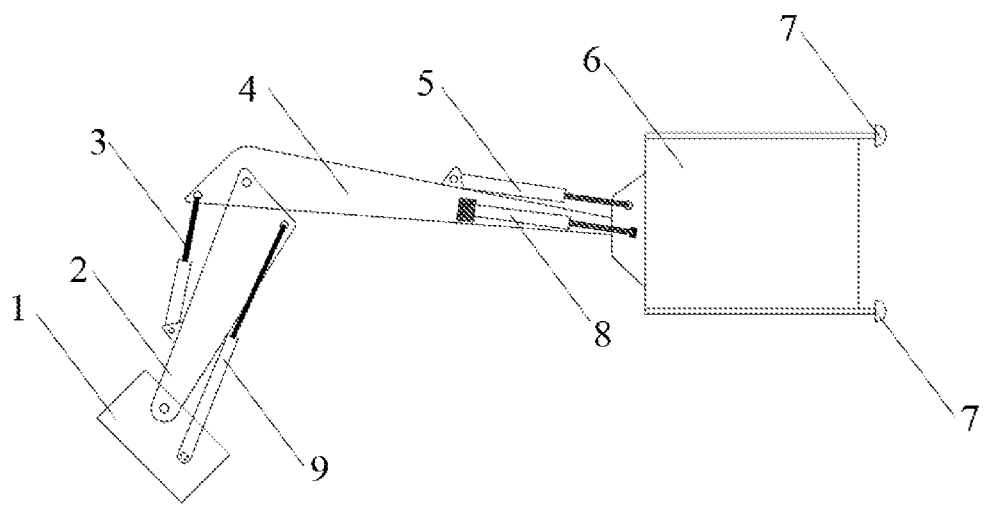
FIG. 2 is a schematic structural diagram of a fixing module of the first embodiment.
Figure 3:
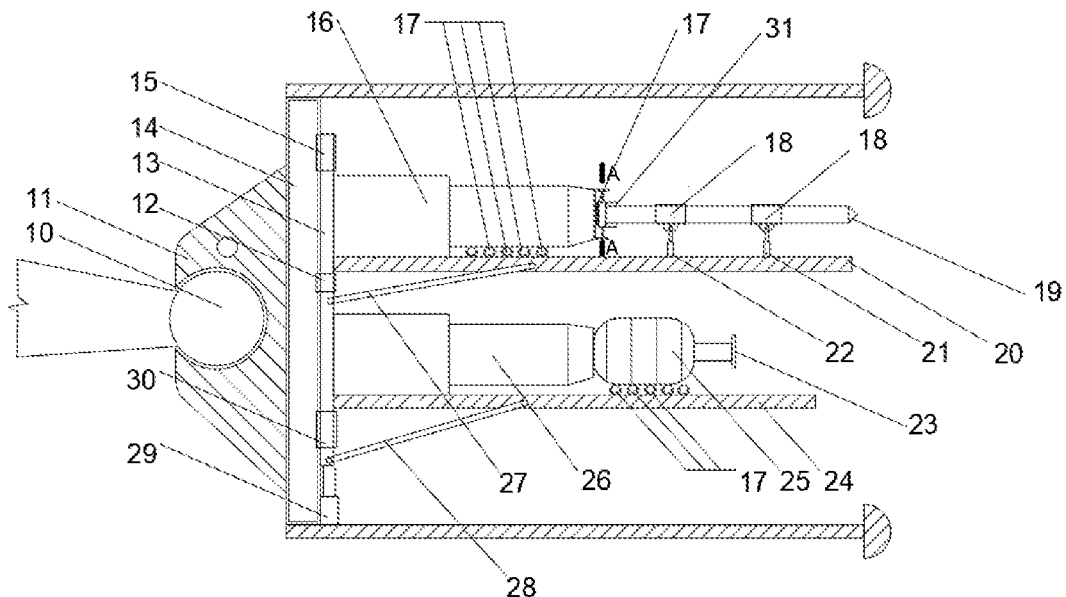
FIG. 3 is a schematic structural diagram of a test box of the first embodiment.

As shown in FIG. 2, the test box 6 and mechanical arms are connected by two drive links and a steel ball 10 to ensure that the test box 6 can rotate freely within 360°;

As shown in FIG. 3, the surrounding rock polishing module and the surrounding rock wear resistance testing module are located in the test box 6 to avoid damage by the falling surrounding rock. The test box 6 is carried on the mechanical arms and moves with the mechanical arms, and the mechanical arms are mounted on a TBM.

Specifically, the fixing module includes a base 1, a first mechanical arm 2, a first drive link 3, a second mechanical arm 4, a second drive link 5, a test box 6, support legs 7, a third drive link 8, a fourth drive link 9, a first fixing tube 12, a second fixing tube 15, a third fixing tube 30, a support column 13, an upright column 14, and a fifth hydraulic drive mechanism 29; the base 1 is used to fix the mechanical arms on the TBM; the mechanical arms and the links work together to drive the test box 6 to move in a tunnel space, and the four drive links are connected with and controlled by the central control module; the support legs 7 are in contact with the surrounding rock during testing, and transfer a support reaction force to ensure the smooth progress of testing; there are three support legs 7; the support column 13 is bound on a side of the upright column 14 by the first fixing tube 12, the second fixing tube 15, and the third fixing tube 30, and driven by the fifth hydraulic drive mechanism 29 to move axially along the upright column 14; and the fifth hydraulic drive mechanism 29 is connected with and controlled by the central control module.

The surrounding rock polishing module includes a polishing disc 23, a motor 25, a fourth hydraulic drive mechanism 26, a second support beam 24, a second connecting rod, and steel balls 17; the polishing disc 23 can finely polish the surrounding rock under the drive of the motor 25; the fourth hydraulic drive mechanism 26 can provide support to the motor 25 and the polishing disc 23 to ensure that the polishing disc 23 is in close contact with the surrounding rock; the steel balls are located under the motor 25 to ensure that the motor 25 can slide freely; the second support beam 24 provides a working platform for the motor 25 and the fourth hydraulic drive mechanism 26; and the motor 25 and the fourth hydraulic drive mechanism 26 are connected with and controlled by the central control module.

The surrounding rock wear resistance testing module includes a locator, a steel needle 19, a fixing sleeve 18, balls 17, a first support beam 20, a first hydraulic drive mechanism 16, a second hydraulic drive mechanism 21, and a third hydraulic drive mechanism 22; the steel needle 19 is used to being in vertical contact with a rock surface to test the wear resistance of the surrounding rock; the fixing sleeve 18 is used to fix the steel needle 19 with the second hydraulic drive mechanism 21 and the third hydraulic drive mechanism 22; the second hydraulic drive mechanism 21 and the third hydraulic drive mechanism 22 are used to push the steel needle 19 to move along the test plane; and the second hydraulic drive mechanism 21 and the third hydraulic drive mechanism 22 are connected with and controlled by the central control center.

Figure 4:
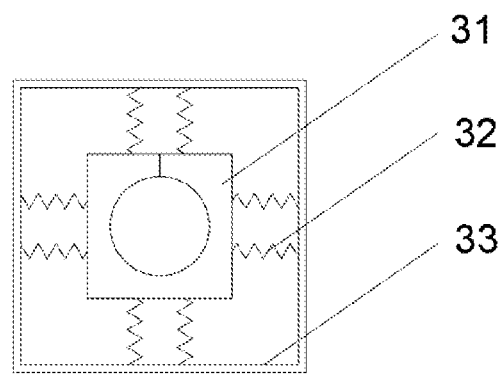
FIG. 4 is an enlarged view of a locator of the first embodiment, i.e., a cross-sectional view taken along line A-A in FIG. 3.

As shown in FIG. 4, the locator is used to ensure that the axis of the steel needle 19 is parallel to the axial direction of the first hydraulic drive mechanism 16; the locator can move freely in a plane perpendicular to the axis of the first hydraulic drive mechanism 16, and is limited by springs; there are many steel balls between the locator and the first hydraulic drive mechanism 16 to ensure that only the load in the direction of the drive axis is transmitted between the steel needle 19 and the first hydraulic drive mechanism 16; the first hydraulic drive mechanism 16 is used to apply a load to the steel needle 19 along the axis of the hydraulic drive mechanism; the first hydraulic drive mechanism 16 is connected with and controlled by the central control module; and the first support beam 20 provides a working platform for the first hydraulic drive mechanism 16, the second hydraulic drive mechanism 21 and the third hydraulic drive mechanism 22.

In the above modules, the first support beam 20, the first connecting rod 27, the second support beam 24, and the second connecting rod 28 are fixed on the support column 13 and transfer the loads of the first hydraulic drive mechanism 16, the balls 17, the fixing sleeve 18, the steel needle 19, the first support beam 20, the second hydraulic drive mechanism 21, the third hydraulic drive mechanism 22, the polishing disc 23, the second support beam 24, the motor 25, the fourth hydraulic drive mechanism 26, the first connecting rod 27, and the second connecting rod 28 and the drive reaction forces of the first hydraulic drive mechanism 16, the second hydraulic drive mechanism 21, the third hydraulic drive mechanism 22, and the fourth hydraulic drive mechanism 26 to the support column 13.

Figure 5:
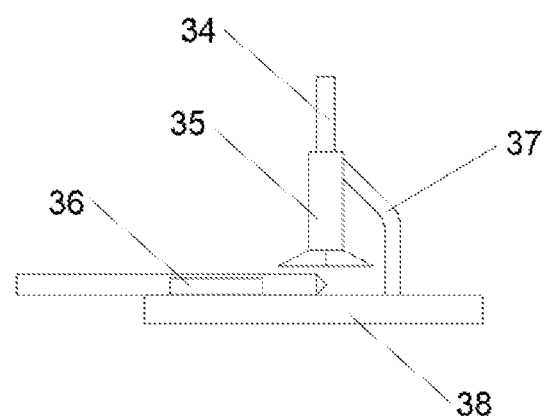
FIG. 5 is a schematic structural diagram of a reader of the first embodiment.

After the testing, the wear of the steel needle 19 is read by the reading module. As shown in FIG. 5, the reading module includes an eyepiece 34, an objective lens 35, a semicircular locating tube 36, a support arm 37 and a support seat 38; the eyepiece 34 cooperates with the objective lens 35 to amplify wear details of the tip of the steel needle 19; the support arm 37 is used to provide a support force to the eyepiece 34 and the objective lens 35; the semicircular locating tube 36 is used to restrain the displacement of the steel needle 19 from rolling, which facilitates reading; and the support seat 38 provides a support force for the eyepiece 34, the objective lens 35, the semicircular locating tube 36 and the support arm 37.

A working method of the TBM-mounted surrounding rock wear resistance testing system includes the following steps:
A. A test area without large fluctuations is pre-selected from the surrounding rock of a tunnel, and the mechanical arms press the test box 6 against the surrounding rock under the action of the drive links;
B. The fourth hydraulic drive mechanism 26 pushes the motor 25 to approach the surrounding rock and maintains certain push;
C. The motor 25 works to drive the polishing disc 23 to rotate and polish a plane on the surrounding rock until the plane meets the requirements of a wear resistance test;
D. The fifth hydraulic drive mechanism 29 works to drive the support column 13 to move axially along the column 14, so that the steel needle 19 is located in the test area;
E. The first hydraulic drive mechanism 16 works to keep the steel needle 19 close to the rock and keeps the pressure to the steel needle 19 unchanged;
F. The second hydraulic drive mechanism 21 and the third hydraulic drive mechanism 22 push the steel needle 19 to move a certain distance at a certain speed along the test plane of the surrounding rock;
G. The first hydraulic drive mechanism 16 withdraw the pressure to the steel needle 19, and the steel needle 19 is removed;
H. The steel needle 19 is put into the semicircular locating tube 36 of the reading module, and the wear of the tip of the steel needle 19 is observed and read (as shown in FIG. 6(a), A and B show the situation when the steel needle 19 is not worn, and A' and B' show the data when the steel needle 19 is worn); the steel needle 19 is turned 120° and read again (as shown in FIG. 6(b)), and the steel needle 120° is continuously turned and read; the average value of the three readings is the measurement result of the wear resistance of the surrounding rock;
I. The mechanical arms move under the action of the drive links, and the test box 6 and the mechanical arms return to stop positions.

Of course, in other embodiments, the structures of some modules can be changed. For example, other three-dimensional motion mechanisms are used instead of the fixing module to drive the test box 6 to move, the test steel needle 19 is not selected as the test piece, but a test tool is selected, etc. These are all simple replacements and should fall into the protection scope of the present disclosure. Similarly, in the test of wear, different angles can be selected to test the wear situation of the steel needle 19 or other testing mechanisms. The setting angle of the testing mechanism is not necessarily 120°.

For example, Embodiment 2:
The difference from Embodiment 1 is:
The end of the second mechanical arm in this embodiment is detachably connected to the surrounding rock polishing module or the surrounding rock wear resistance testing module. As shown in FIGS. 7 and 8, the surrounding rock polishing module or the surrounding rock wear resistance testing module is connected to the second mechanical arm by plugging, threaded connection or other detachable connection methods. The surrounding rock polishing module can be installed first for polishing, and then the surrounding rock wear resistance testing module is installed for testing to reduce the size of the overall system. Such change facilitates practical applications.

Described above are merely preferred embodiments of the present disclosure, and the present disclosure is not limited thereto. Various modifications and variations may be made to the present disclosure for those skilled in the art. Any modification, equivalent substitution, improvement or the like made within the spirit and principle of the present disclosure shall fall into the protection scope of the present disclosure.

Although the specific embodiments of the present disclosure are described above in combination with the accompanying drawing, the protection scope of the present disclosure is not limited thereto. It should be understood by those skilled in the art that various modifications or variations could be made by those skilled in the art based on the technical solution of the present disclosure without any creative effort, and these modifications or variations shall fall into the protection scope of the present disclosure.

The invention claimed is:
1. A TBM-mounted surrounding rock wear resistance testing system, comprising:
a fixing module, arranged on a TBM, the fixing module has a movable end for extending to the surrounding rock of a tunnel, the fixing module including:
a movable end transmission mechanism comprising a first mechanical arm and a second mechanical arm, one end of the first mechanical arm is hinged with the TBM, the other end of the first mechanical arm is hinged with one end of the second mechanical arm;

a surrounding rock polishing module, arranged on the movable end, the surrounding rock polishing module comprises a polishing mechanism for polishing a surrounding rock test area;

a surrounding rock wear resistance testing module, arranged on the movable end, capable of following the movable end to move to the surrounding rock test area, and comprising a testing mechanism for testing the wear resistance of the polished surrounding rock test area and a drive mechanism thereof; and a central control module, configured to control the motion states and performed operations of the fixing module, the surrounding rock polishing module and the surrounding rock wear resistance testing module; and determine the wear resistance of the surrounding rock according to the wear resistance test result, wherein:

the movable end comprises a connecting block that is provided with a spherical cavity for accommodating a spherical structure, and the spherical structure is fixedly connected with the second mechanical arm;

the movable end is provided with a protective box for protecting the surrounding rock polishing module and the surrounding rock wear resistance testing module;

a bottom plate of the protective box is fixedly connected with the connecting block; and the protective box is provided with an opening on a side facing the surrounding rock, and the open side is provided with support legs in contact with the surrounding rock.

2. The TBM-mounted surrounding rock wear resistance testing system according to claim 1, wherein the surrounding rock polishing module and/or the surrounding rock wear resistance testing module are detachably connected to the movable end; or the surrounding rock polishing module and the surrounding rock wear resistance testing module are integrally arranged on the movable end by a connecting mechanism.

3. A testing method based on the system according to claim 2, comprising the following steps:

determining a surrounding rock test area of a tunnel;

adjusting the position of the surrounding rock polishing module arranged on the TBM, so that the polishing mechanism of the surrounding rock polishing module is aligned with the surrounding rock test area for polishing;

adjusting the position of the surrounding rock wear resistance testing module arranged on the TBM, so that the testing mechanism of the surrounding rock wear resistance testing module is aligned with the polished surrounding rock test area to test the wear resistance; and determining the wear resistance of the surrounding rock according to the test result of the wear resistance test.

4. The TBM-mounted surrounding rock wear resistance testing system according to claim 1, wherein the fixing module further comprises and a movable end drive mechanism, the operation of the movable end transmission mechanism and a position of the movable end are controlled by the driving of the movable end drive mechanism.

5. The TBM-mounted surrounding rock wear resistance testing system according to claim 4, wherein:

the movable end drive mechanism comprises a first drive link, a second drive link, a third drive link and a fourth drive link;

two ends of the first drive link are respectively hinged with the first mechanical arm and the second mechanical arm;

two ends of the second drive link are respectively connected with the second mechanical arm and the movable end;

two ends of the third drive link are respectively hinged with the second mechanical arm and the movable end; and two ends of the fourth drive link are respectively hinged with the first mechanical arm and the TBM.

6. A testing method based on the system according to claim 5, comprising the following steps:

determining a surrounding rock test area of a tunnel;

adjusting the position of the surrounding rock polishing module arranged on the TBM, so that the polishing mechanism of the surrounding rock polishing module is aligned with the surrounding rock test area for polishing;

adjusting the position of the surrounding rock wear resistance testing module arranged on the TBM, so that the testing mechanism of the surrounding rock wear resistance testing module is aligned with the polished surrounding rock test area to test the wear resistance; and determining the wear resistance of the surrounding rock according to the test result of the wear resistance test.

7. A testing method based on the system according to claim 4, comprising the following steps:

determining a surrounding rock test area of a tunnel;

adjusting the position of the surrounding rock polishing module arranged on the TBM, so that the polishing mechanism of the surrounding rock polishing module is aligned with the surrounding rock test area for polishing;

adjusting the position of the surrounding rock wear resistance testing module arranged on the TBM, so that the testing mechanism of the surrounding rock wear resistance testing module is aligned with the polished surrounding rock test area to test the wear resistance; and determining the wear resistance of the surrounding rock according to the test result of the wear resistance test.

8. The TBM-mounted surrounding rock wear resistance testing system according to claim 1, wherein the surrounding rock polishing module comprises a fourth hydraulic drive mechanism arranged at the movable end and capable of extending and retracting in an axial direction, a motor, and a polishing disc arranged outward;

a free end of the fourth hydraulic drive mechanism is fixedly connected to the motor, and a telescopic shaft of the motor is coaxially and fixedly connected with the polishing disc.

9. The TBM-mounted surrounding rock wear resistance testing system according to claim 8, wherein the surrounding rock polishing module further comprises a second support beam arranged at the movable end in a vertically movable manner, the fourth hydraulic drive mechanism is arranged on the second support beam, and balls are arranged between the motor and the second support beam.

10. A testing method based on the system according to claim 9, comprising the following steps:

determining a surrounding rock test area of a tunnel;

adjusting the position of the surrounding rock polishing module arranged on the TBM, so that the polishing mechanism of the surrounding rock polishing module is aligned with the surrounding rock test area for polishing;
adjusting the position of the surrounding rock wear resistance testing module arranged on the TBM, so that the testing mechanism of the surrounding rock wear resistance testing module is aligned with the polished surrounding rock test area to test the wear resistance; and
determining the wear resistance of the surrounding rock according to the test result of the wear resistance test.

11. A testing method based on the system according to claim 8, comprising the following steps:
determining a surrounding rock test area of a tunnel;
adjusting the position of the surrounding rock polishing module arranged on the TBM, so that the polishing mechanism of the surrounding rock polishing module is aligned with the surrounding rock test area for polishing;
adjusting the position of the surrounding rock wear resistance testing module arranged on the TBM, so that the testing mechanism of the surrounding rock wear resistance testing module is aligned with the polished surrounding rock test area to test the wear resistance; and
determining the wear resistance of the surrounding rock according to the test result of the wear resistance test.

12. The TBM-mounted surrounding rock wear resistance testing system according to claim 1, wherein the surrounding rock wear resistance testing module comprises a first hydraulic drive mechanism arranged at the movable end and capable of extending and retracting in an axial direction, a free end of the first hydraulic drive mechanism is detachably provided with a steel needle, and the steel needle is parallel to the axis of the first hydraulic drive mechanism.

13. The TBM-mounted surrounding rock wear resistance testing system according to claim 12, wherein the surrounding rock wear resistance testing module further comprises a first support beam arranged at the movable end in a vertically movable manner, the first hydraulic drive mechanism is arranged on the first support beam, at least one second hydraulic drive mechanism capable of extending and retracting vertically is further arranged on the first support beam, a free end of the second hydraulic drive mechanism is provided with a fixing sleeve for fixing the steel needle, the steel needle is arranged at the free end of the first hydraulic drive mechanism in a manner of being movable along a vertical plane, and the vertical plane is perpendicular to the axial direction of the steel needle.

14. A testing method based on the system according to claim 13, comprising the following steps:
determining a surrounding rock test area of a tunnel;
adjusting the position of the surrounding rock polishing module arranged on the TBM, so that the polishing mechanism of the surrounding rock polishing module is aligned with the surrounding rock test area for polishing;
adjusting the position of the surrounding rock wear resistance testing module arranged on the TBM, so that the testing mechanism of the surrounding rock wear resistance testing module is aligned with the polished surrounding rock test area to test the wear resistance; and
determining the wear resistance of the surrounding rock according to the test result of the wear resistance test.

15. A testing method based on the system according to claim 12, comprising the following steps:
determining a surrounding rock test area of a tunnel;
adjusting the position of the surrounding rock polishing module arranged on the TBM, so that the polishing mechanism of the surrounding rock polishing module is aligned with the surrounding rock test area for polishing;
adjusting the position of the surrounding rock wear resistance testing module arranged on the TBM, so that the testing mechanism of the surrounding rock wear resistance testing module is aligned with the polished surrounding rock test area to test the wear resistance; and
determining the wear resistance of the surrounding rock according to the test result of the wear resistance test.

16. A testing method based on the system according to claim 1, comprising the following steps:
determining a surrounding rock test area of a tunnel;
adjusting the position of the surrounding rock polishing module arranged on the TBM, so that the polishing mechanism of the surrounding rock polishing module is aligned with the surrounding rock test area for polishing;
adjusting the position of the surrounding rock wear resistance testing module arranged on the TBM, so that the testing mechanism of the surrounding rock wear resistance testing module is aligned with the polished surrounding rock test area to test the wear resistance; and
determining the wear resistance of the surrounding rock according to the test result of the wear resistance test.

* * * * *